(12) United States Patent
Lin (10) Patent No.: US 7,118,116 B2
(45) Date of Patent: Oct. 10, 2006

(54) STROLLER HAVING FRONT WHEELS THAT CAN BE TURNED STABLY AND SMOOTHLY

(76) Inventor: Wang-Hsing Lin, 58, Ma Yuan West St., Taichung (TW)

( * ) Notice: Subject to any disclaimer, the term of this patent is extended or adjusted under 35 U.S.C. 154(b) by 319 days.

(21) Appl. No.: 10/770,040

(22) Filed: Jan. 30, 2004

(65) Prior Publication Data
US 2005/0167952 A1    Aug. 4, 2005

(51) Int. Cl.
*B62B 7/04* (2006.01)
(52) U.S. Cl. .................................................. 280/47.38
(58) Field of Classification Search ................ 280/642, 280/647, 650, 657, 658, 47.38, 79.2, 87.042, 280/87.05; 16/44, 23, 35 D
See application file for complete search history.

(56) References Cited

U.S. PATENT DOCUMENTS

| | | | | |
|---|---|---|---|---|
| 2,577,244 A | * | 12/1951 | Hedgpeth | 16/44 |
| 5,305,496 A | * | 4/1994 | Gagnon et al. | 16/44 |
| 5,581,843 A | * | 12/1996 | Purnell | 16/35 R |
| 6,398,238 B1 | * | 6/2002 | Shaw | 280/87.042 |
| 6,557,873 B1 | * | 5/2003 | Nardone | 280/87.042 |
| 6,663,122 B1 | * | 12/2003 | Lin | 280/47.38 |
| 6,854,745 B1 | * | 2/2005 | Driessen et al. | 280/47.38 |
| 6,896,286 B1 | * | 5/2005 | Lin | 280/650 |
| 6,938,300 B1 | * | 9/2005 | Lan | 16/18 R |
| 2004/0100053 A1 | * | 5/2004 | Chen | 280/87.041 |

* cited by examiner

*Primary Examiner*—Frank Vanaman
(74) *Attorney, Agent, or Firm*—Alan D. Kamrath; Nikolai & Mersereau, P.A.

(57) ABSTRACT

A stroller includes a main frame, a linkage, a support unit, and a shock-absorbing device. Thus, the front wheels of the stroller can be turned rightward and leftward stably and smoothly. In addition, the front wheels of the stroller are turned easily and conveniently, thereby facilitating the user operating the stroller. Further, the stroller has a shock-absorbing effect.

18 Claims, 10 Drawing Sheets

STROLLER HAVING FRONT WHEELS THAT CAN BE TURNED STABLY AND SMOOTHLY

BACKGROUND OF THE INVENTION

1. Field of the Invention

The present invention relates to a stroller, and more particularly to a stroller having front wheels that can be turned rightward and leftward stably and smoothly.

2. Description of the Related Art

A conventional stroller comprises a main frame having a front wheel and two rear wheels. However, the front wheel is moved in a linear direction during movement of the stroller and cannot be turned rightward or leftward, thereby causing inconvenience to the user when operating the stroller to turn rightward or leftward. In addition, the conventional stroller cannot provide a shock-absorbing effect.

SUMMARY OF THE INVENTION

The primary objective of the present invention is to provide a stroller whose front wheels can be turned rightward and leftward stably and smoothly.

Another objective of the present invention is to provide a stroller that is turned easily and conveniently, thereby facilitating the user operating the stroller.

A further objective of the present invention is to provide a stroller having a shock-absorbing effect.

In accordance with the present invention, there is provided a stroller, comprising a main frame, a linkage, and a support unit, wherein:

the main frame has two bottom rails and two front wheels;

the linkage includes two shaft seats, two mounting sleeves, an elbow, two mounting rings, two connecting tubes, two wheel shafts, and an elastic member;

each of the shaft seats has a first end formed with two support plates and a receiving space located between the two support plates, and a second end formed with a barrel having an inside formed with a through hole, the barrel has a periphery formed with a recess communicating with the through hole;

each of the mounting sleeves is pivotally mounted on a respective one of the shaft seats and has a first end formed with a pivot portion pivotally mounted in the receiving space between the support plates of the respective shaft seat and a second end formed with a mounting portion;

the elbow is mounted between the mounting sleeves;

each of the mounting rings is mounted in the recess of the barrel of a respective one of the two shaft seats and has an inner wall formed with a through bore aligning with the through hole of the barrel and a protruding locking block extended radially inward from the through bore;

each of the connecting tubes is mounted in the through hole of the barrel of a respective one of the shaft seats and extended through the through bore of a respective one of the mounting rings;

each of the wheel shafts is extended through a respective one of the front wheels and detachably locked in a respective one of the connecting tubes;

the elastic member is urged between the shaft seats;

the support unit is mounted on the linkage and includes two joints, a main bracket, a cover, a support bracket, a mounting tube, an inner tube, and two connecting seats;

each of the joints has a first side formed with a base pivotally mounted on a respective one of the shaft seats and a second side formed with a socket;

the main bracket is mounted between the joints;

the cover is mounted on the main bracket;

the support bracket is mounted on the main bracket and has a lower portion formed with two opposite support plates each formed with a first hole and a second hole;

the mounting tube is mounted between the support plates of the support bracket and is aligned with the second hole of each of the support plates;

the inner tube is mounted in the mounting tube and has two ends protruding from the support plates of the support bracket;

each of the connecting seats is mounted between the support bracket and a respective one of the bottom rails of the main frame and includes a first sleeve mounted on a respective end of the inner tube and a second sleeve mounted on a front end of a respective one of the bottom rails.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–8, a stroller in accordance with the preferred embodiment of the present invention comprises a main frame 1, a linkage 2, a support unit 3, and a shock-absorbing device 4.

The main frame 1 has two front rails 11, two bottom rails 12 and two front wheels 13.

The linkage 2 includes two shaft seats 21, two mounting sleeves 22, an elbow 23, two mounting rings 24, two connecting tubes 25, two wheel shafts 26, and an elastic member 27.

Figure 1:
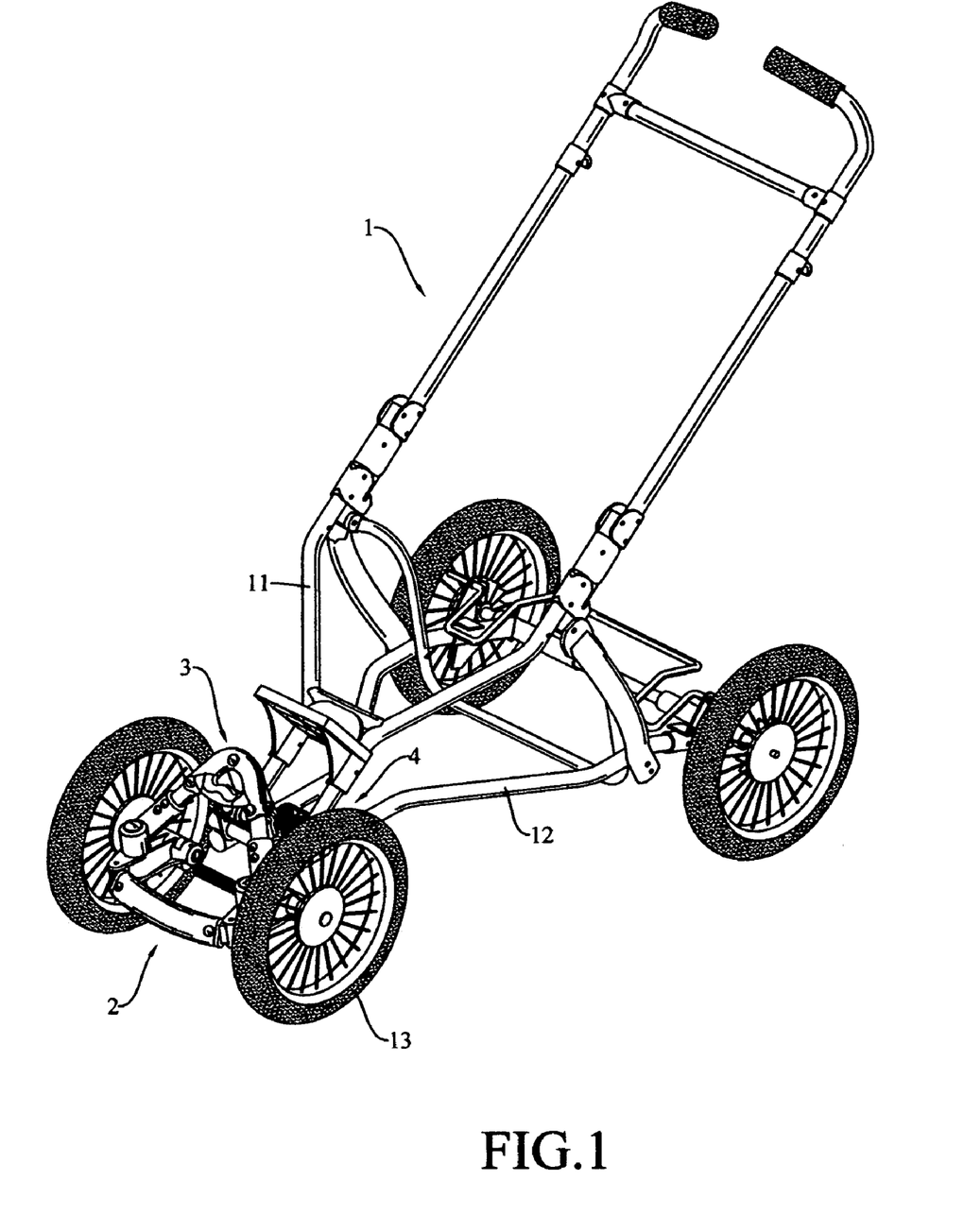
FIG. 1 is a perspective view of a stroller in accordance with the preferred embodiment of the present invention.
Figure 2:
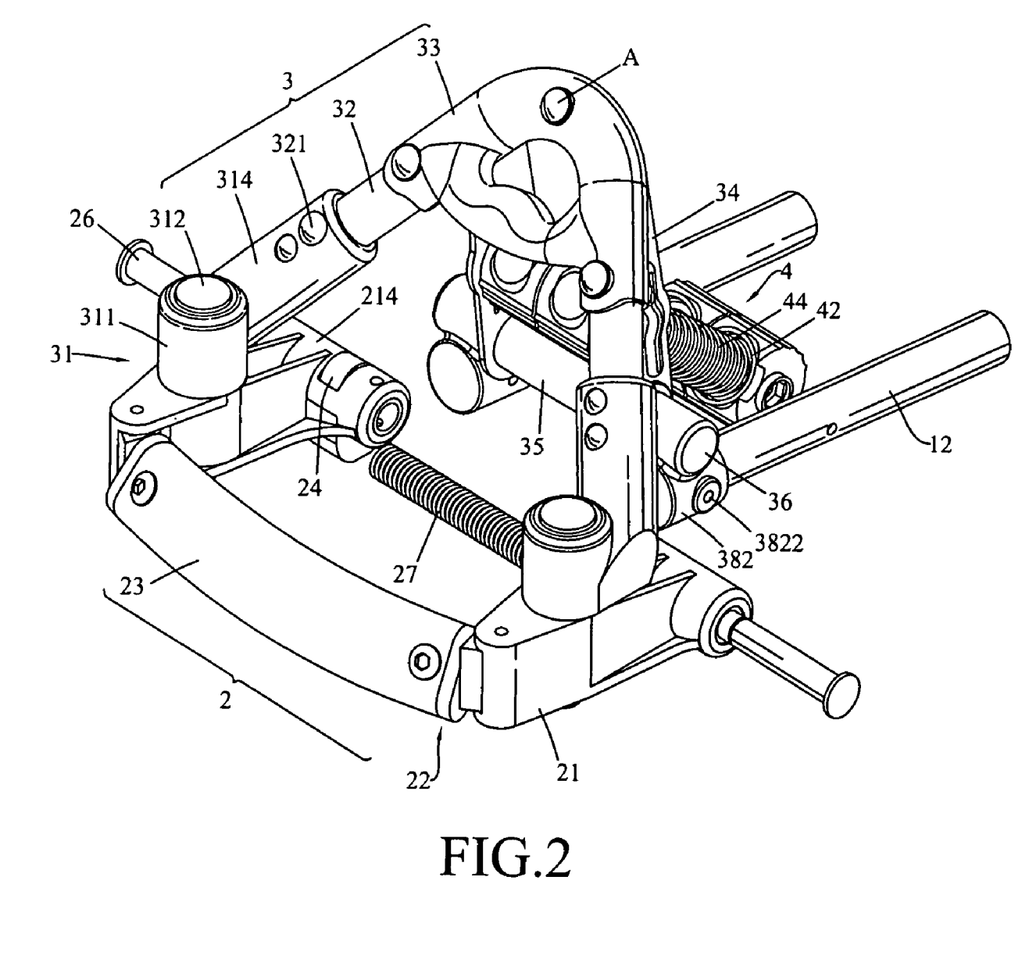
FIG. 2 is a partially perspective view of the stroller in accordance with the preferred embodiment of the present invention.
Figure 3:
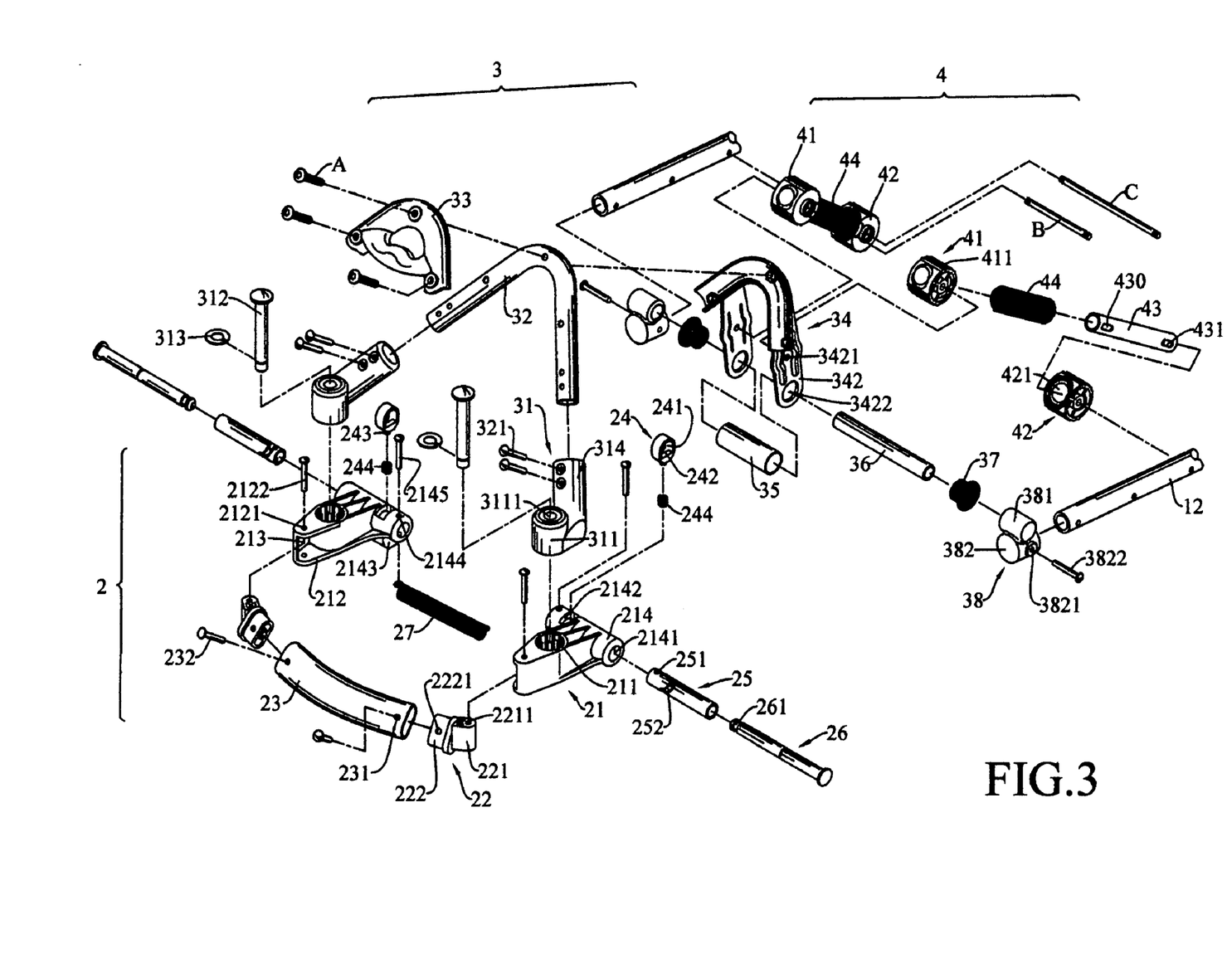
FIG. 3 is an exploded perspective view of the stroller as shown in FIG. 1.
Figure 6:
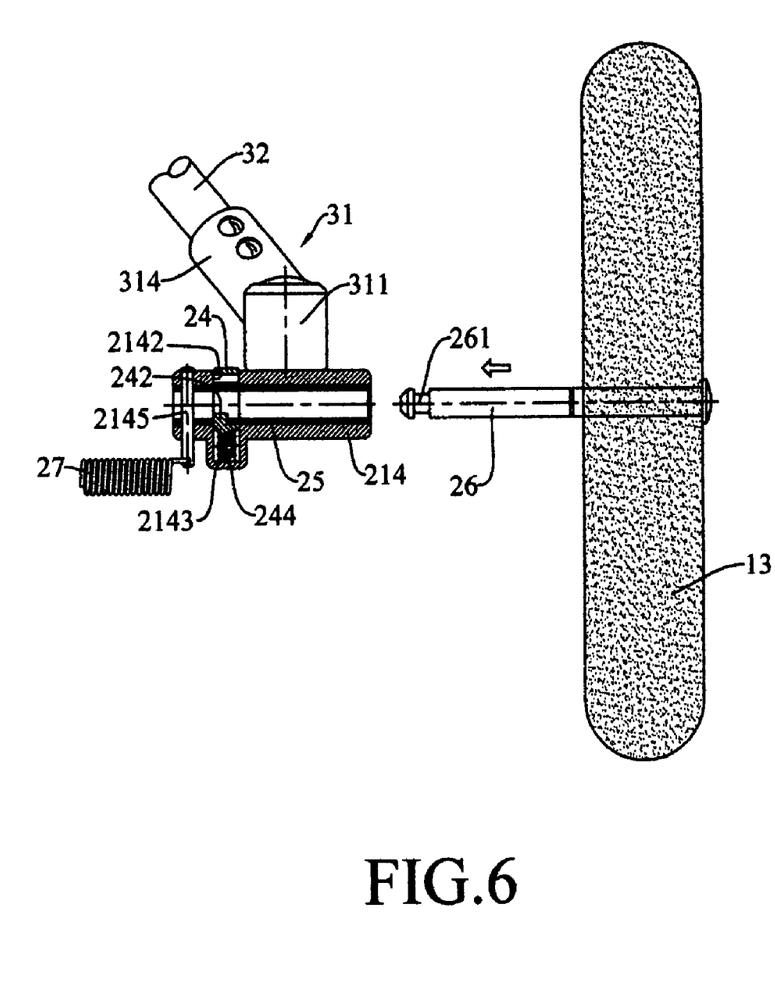
FIG. 6 is a partially plan exploded cross-sectional view of the stroller as shown in FIG. 2.
Figure 7:
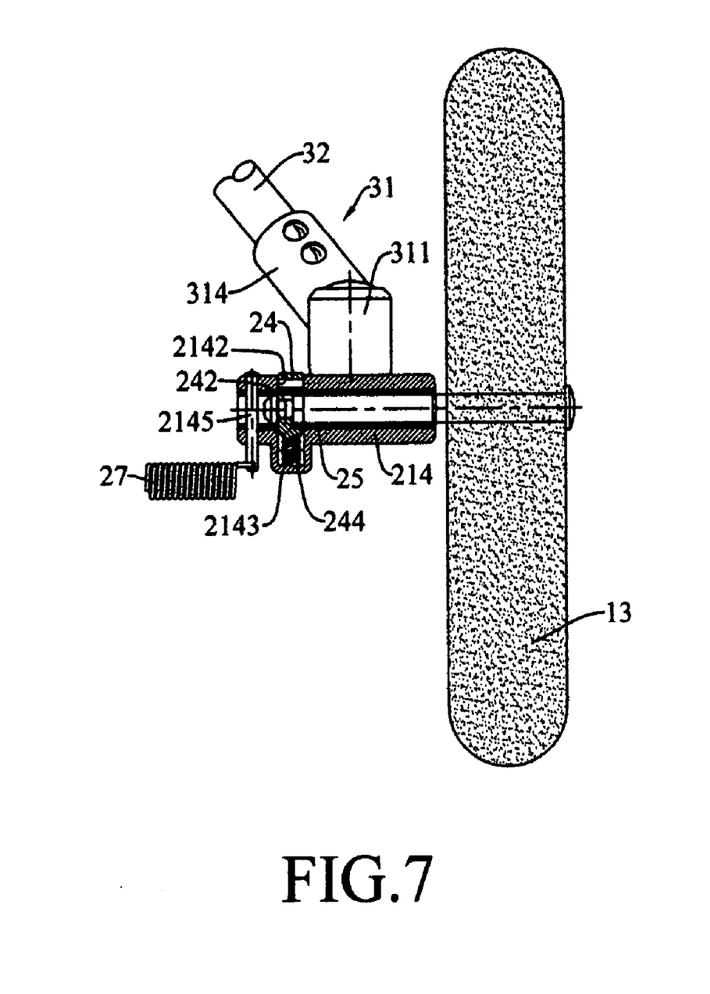
FIG. 7 is a plan assembly view of the stroller as shown in FIG. 6.

Each of the shaft seats 21 is formed with an axial hole 211 and has a first end formed with two support plates 212 and a receiving space 213 located between the two support plates 212, and a second end formed with a barrel 214 having an inside formed with a through hole 2141. Each of the support plates 212 is formed with a pivot hole 2121. The barrel 214 has a periphery formed with a recess 2142 communicating with the through hole 2141 and a chamber 2143 (see FIGS.

3 and 6) located opposite to the recess 2142 and communicating with the through hole 2141. The barrel 214 is formed with a fixing hole 2144 located beside the recess 2142.

Each of the mounting sleeves 22 is pivotally mounted on a respective one of the shaft seats 21 and has a first end formed with a pivot portion 221 pivotally mounted in the receiving space 213 between the support plates 212 of the respective shaft seat 21 and a second end formed with a mounting portion 222. The pivot portion 221 of each of the mounting sleeves 22 is formed with a pivot hole 2211 aligning with the pivot hole 2121 of each of the support plates 212, and the linkage 2 further includes two pivot pins 2122 each extended through the pivot hole 2121 of each of the support plates 212 of a respective one of the shaft seats 21 and the pivot hole 2211 of the pivot portion 221 of a respective one of the mounting sleeves 22, so that each of the mounting sleeves 22 is pivotally mounted on a respective one of the shaft seats 21. The mounting portion 222 of each of the mounting sleeves 22 is formed with a fixing hole 2221.

The elbow 23 is mounted between the mounting sleeves 22 and has two ends each formed with a fixing-hole 231, and the linkage 2 further includes two fixing pins 232 each extended through the respective fixing hole 231 of the elbow 23 and the fixing hole 2221 of the mounting portion 222 of a respective one of the mounting sleeves 22, so that the elbow 23 is mounted between the mounting sleeves 22.

Each of the mounting rings 24 is mounted in the recess 2142 of the barrel 214 of a respective one of the two shaft seats 21 and has an inner wall formed with a through bore 241 aligning with the through hole 2141 of the barrel 214 and a protruding locking block 242 extended radially inward from the through bore 241. Each of the mounting rings 24 has an outer wall formed with a mounting post 243 for mounting an elastic member 244 which is mounted in the chamber 2143 of the barrel 214 and urged between each of the mounting rings 24 and the respective barrel 214.

Each of the connecting tubes 25 is mounted in the through hole 2141 of the barrel 214 of a respective one of the shaft seats 21 and extended through the through bore 241 of a respective one of the mounting rings 24. Each of the connecting tubes 25 has a periphery formed with a passage 252 for passage of the locking block 242 of a respective one of the mounting rings 24. Each of the connecting tubes 25 has an end formed with a fixing hole 251 located beside the passage 252, and the linkage 2 further includes two fixing shafts 2145 each extended through the fixing hole 2144 of the barrel 214 of a respective one of the shaft seats 21 and the fixing hole 251 of a respective one of the connecting tubes 25, so that each of the connecting tubes 25 is fixed on a respective one of the two shaft seats 21.

Each of the wheel shafts 26 is extended through a respective one of the front wheels 13 and detachably locked in a respective one of the connecting tubes 25. Each of the wheel shafts 26 has a tapered distal end formed with a locking groove 261 to detachably lock the locking block 242 of a respective one of the mounting rings 24.

Figure 5:
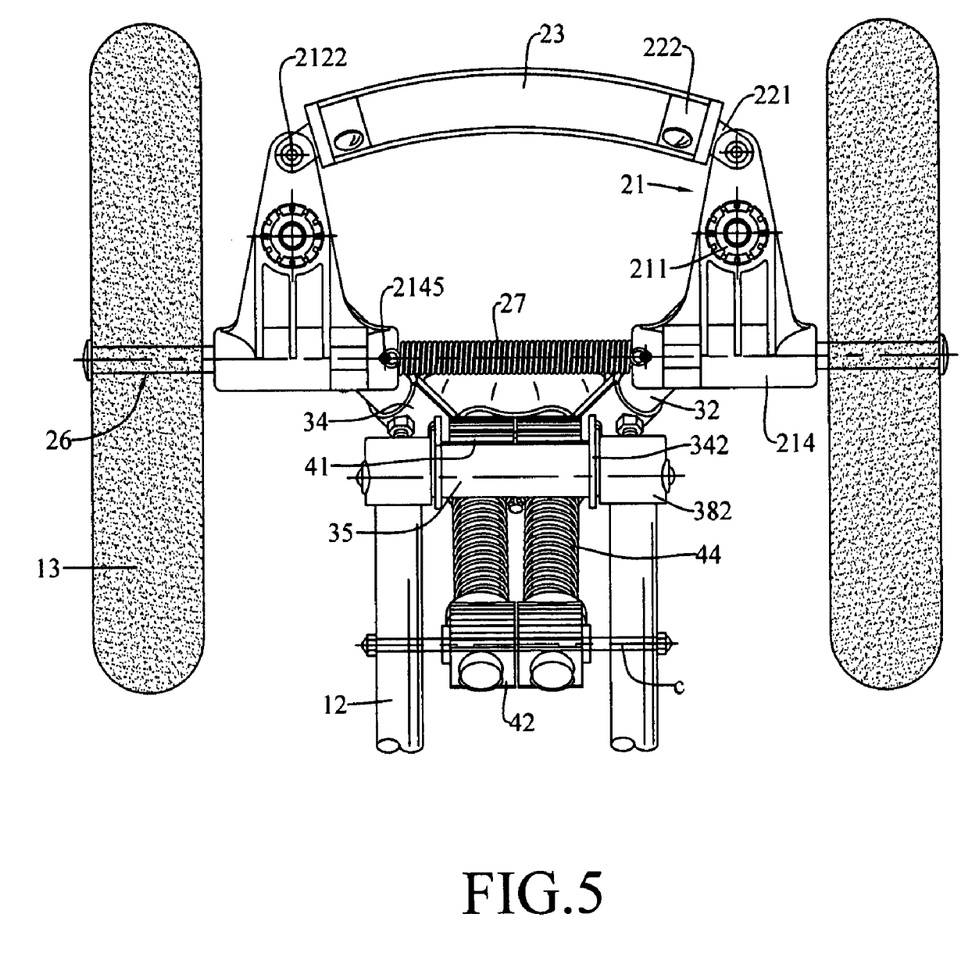
FIG. 5 is a partially bottom plan view of the stroller as shown in FIG. 2.

The elastic member 27 is urged between the shaft seats 21. Each of the fixing shafts 2145 has a distal end protruding from the barrel 214 of a respective one of the shaft seats 21, and the elastic member 27 has two ends each mounted on the distal end of a respective one of the fixing shafts 2145.

The support unit 3 is mounted on the linkage 2 and includes two joints 31, a main bracket 32, a cover 33, a support bracket 34, a mounting tube 35, an inner tube 36, two connecting seats 38, and two rubber jackets 37.

Each of the joints 31 is mounted on a respective one of the shaft seats 21 and has a first side formed with a base 311 pivotally mounted on a respective one of the shaft seats 21 and a second side formed with a socket 314. The base 311 of each of the joints 31 is formed with an axial hole 3111, and the support unit 3 further includes two pivot pins 312 each extended through the axial hole 3111 of the base 311 of a respective one of the joints 31 and the axial hole 211 of a respective one of the shaft seats 21, and two C-shaped snaps 313 each secured on a respective one of the pivot pins 312 and each rested on a respective one of the shaft seats 21, so that each of the joints 31 is pivotally mounted on a respective one of the shaft seats 21.

The main bracket 32 is mounted between the joints 31. The main bracket 32 is substantially inverted V-shaped and has two ends each fixed on the socket 314 of a respective one of the joints 31 by a plurality of fixing pins 321.

The cover 33 is mounted on the main bracket 32.

Figure 8:
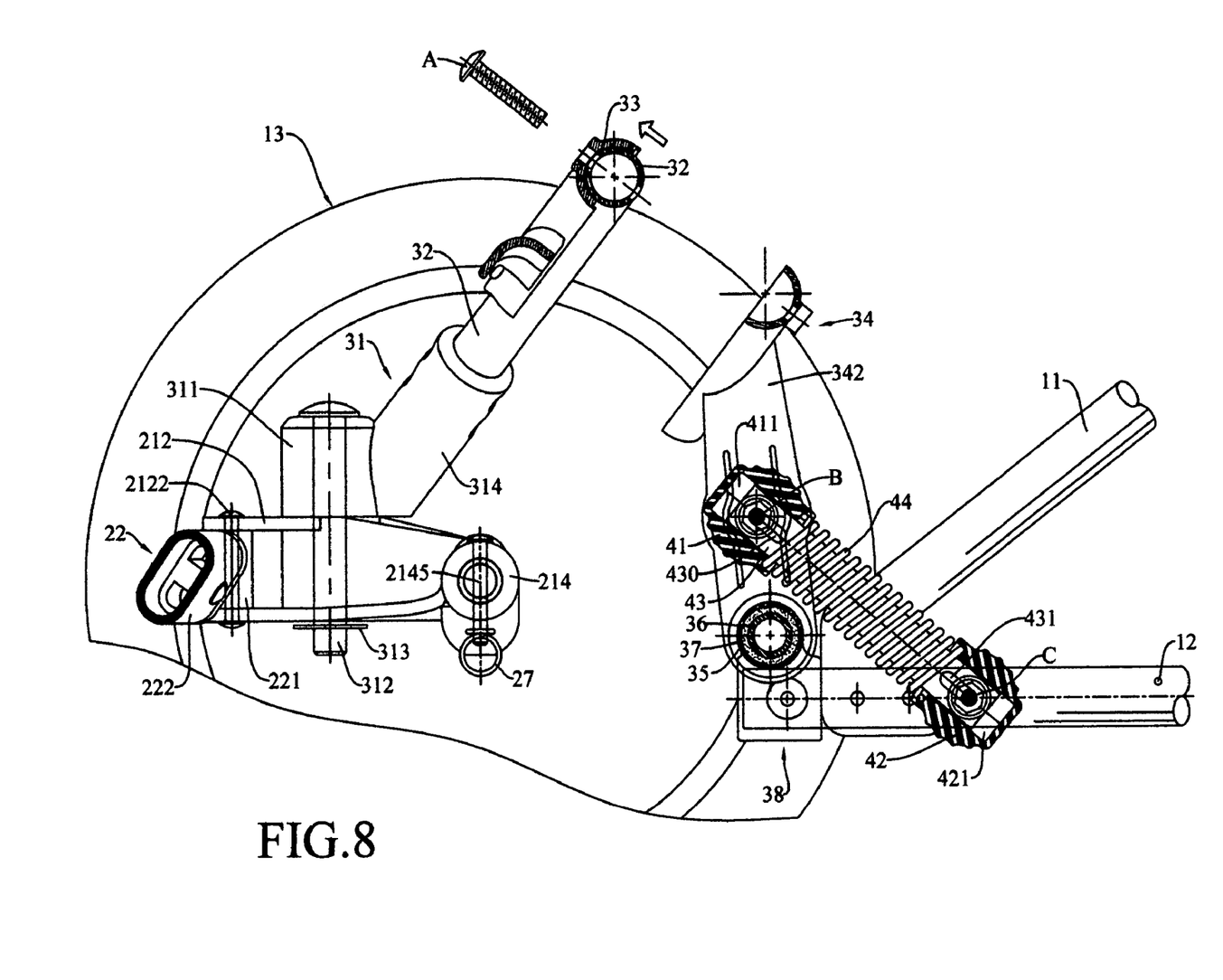
FIG. 8 is an exploded view of the stroller as shown in FIG. 4.

The support bracket 34 is mounted on the main bracket 32 and combined with the cover 33 by a plurality of screw members "A" as shown in FIG. 8, so that the main bracket 32 is clamped between the cover 33 and the support bracket 34. The support bracket 34 has a lower portion formed with two opposite support plates 342 each formed with a first hole 3421 and a second hole 3422.

The mounting tube 35 is mounted between the support plates 342 of the support bracket 34 and is aligned with the second hole 3422 of each of the support plates 342.

The inner tube 36 is mounted in the mounting tube 35 and has two ends protruding from the support plates 342 of the support bracket 34.

Each of the connecting seats 38 is mounted between the support bracket 34 and a respective one of the bottom rails 12 of the main frame 1 and includes a first sleeve 381 mounted on a respective end of the inner tube 36 and a second sleeve 382 mounted on a front end of a respective one of the bottom rails 12. The second sleeve 382 of each of the connecting seats 38 is vertical to the first sleeve 381 and formed with a fixing hole 3821, and the support unit 3 further includes two fixing pins 3822 each extended through the fixing hole 3821 of the second sleeve 382 of a respective one of the connecting seats 38 and fixed in a respective one of the bottom rails 12.

Each of the rubber jackets 37 is mounted on the inner tube 36. Each of the rubber jackets 37 has a stepped shape and has a first portion inserted into the mounting tube 35 and a second portion inserted into the first sleeve 381 of a respective one of the connecting seats 38.

Figure 4:
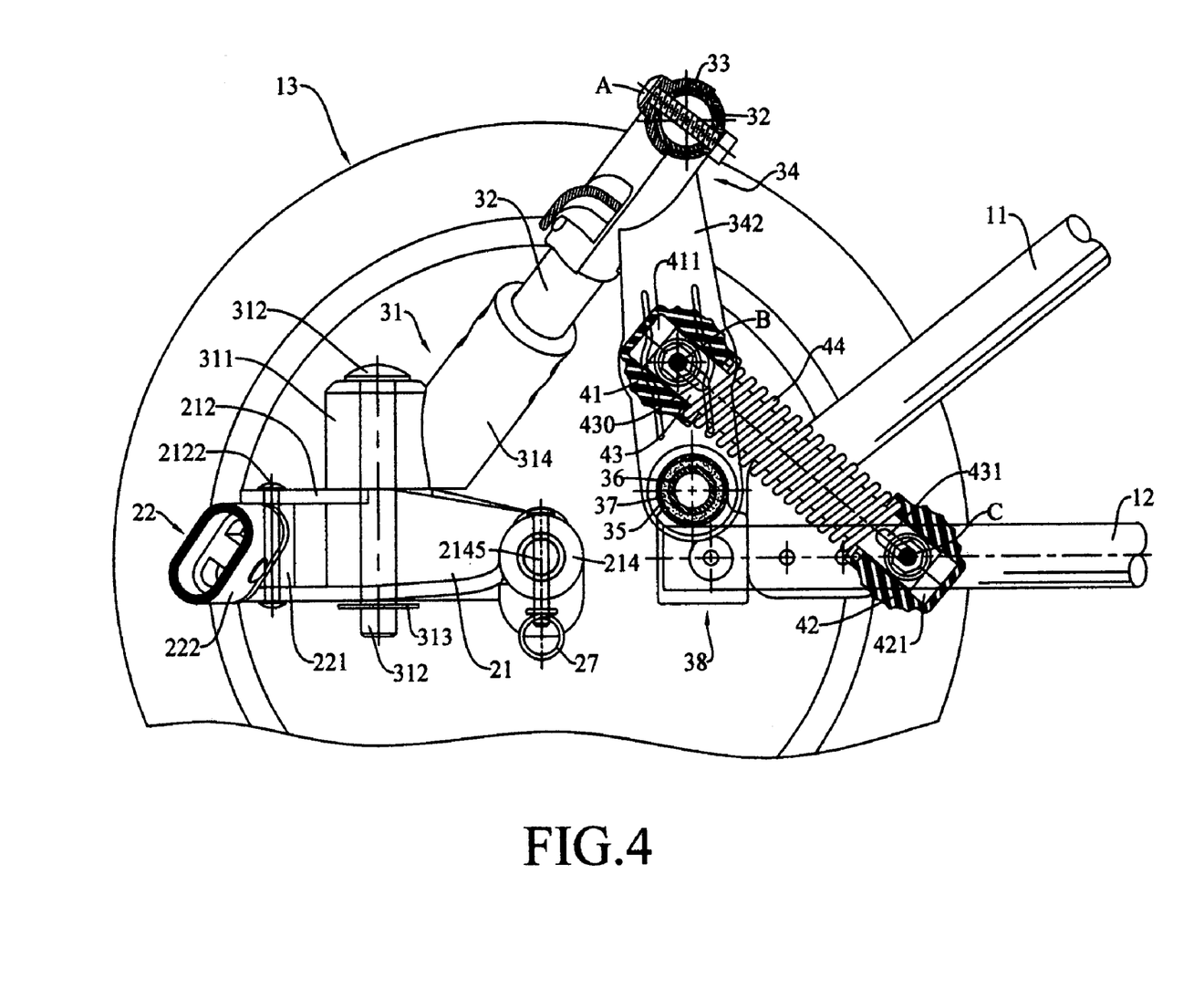
FIG. 4 is a partially side plan cross-sectional view of the stroller as shown in FIG. 2.

The shock-absorbing device 4 is mounted between the main frame 1 and the support unit 3 and includes two first knobs 41, two second knobs 42, two inner rods 43, and two elastic members 44.

Each of the first knobs 41 is pivotally mounted on a respective one of the support plates 342 of the support bracket 34, and the shock-absorbing device 4 further includes two first axles "B" each extended through a respective one of the first knobs 41 and the first hole 3421 of a respective one of the support plates 342 of the support bracket 34. Each of the first knobs 41 is formed with a mounting hole 411.

Each of the second knobs 42 is pivotally mounted on a respective one of the bottom rails 12, and the shock-absorbing device 4 further includes two second axles "C" each extended through a respective one of the second knobs 42 and a respective one of the bottom rails 12. Each of the second knobs 42 is formed with a mounting hole 421.

Each of the inner rods 43 has a first end mounted in the mounting hole 411 of a respective one of the first knobs 41 and a second end mounted in the mounting hole 421 of a respective one of the second knobs 42. The first end of each of the inner rods 43 is formed with an elongated slot 430 for passage of a respective one of the first axles "B", and the second end of each of the inner rods 43 is formed with an elongated slot 431 for passage of a respective one of the second axles "C".

Each of the elastic members 44 is mounted on a respective one of the inner rods 43 and urged between a respective one of the first knobs 41 and a respective one of the second knobs 42.

Figure 9:
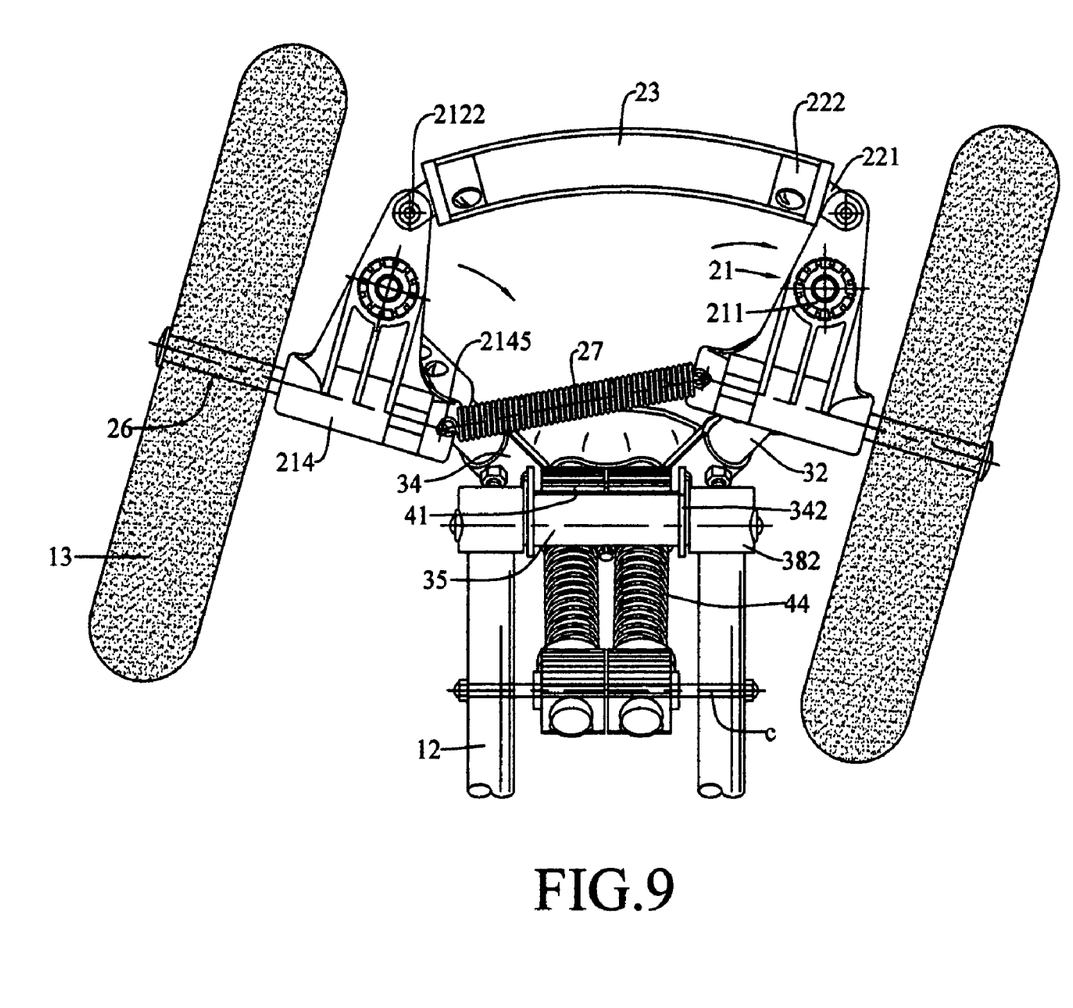
FIG. 9 is a schematic operational view of the stroller as shown in FIG. 5.
Figure 10:
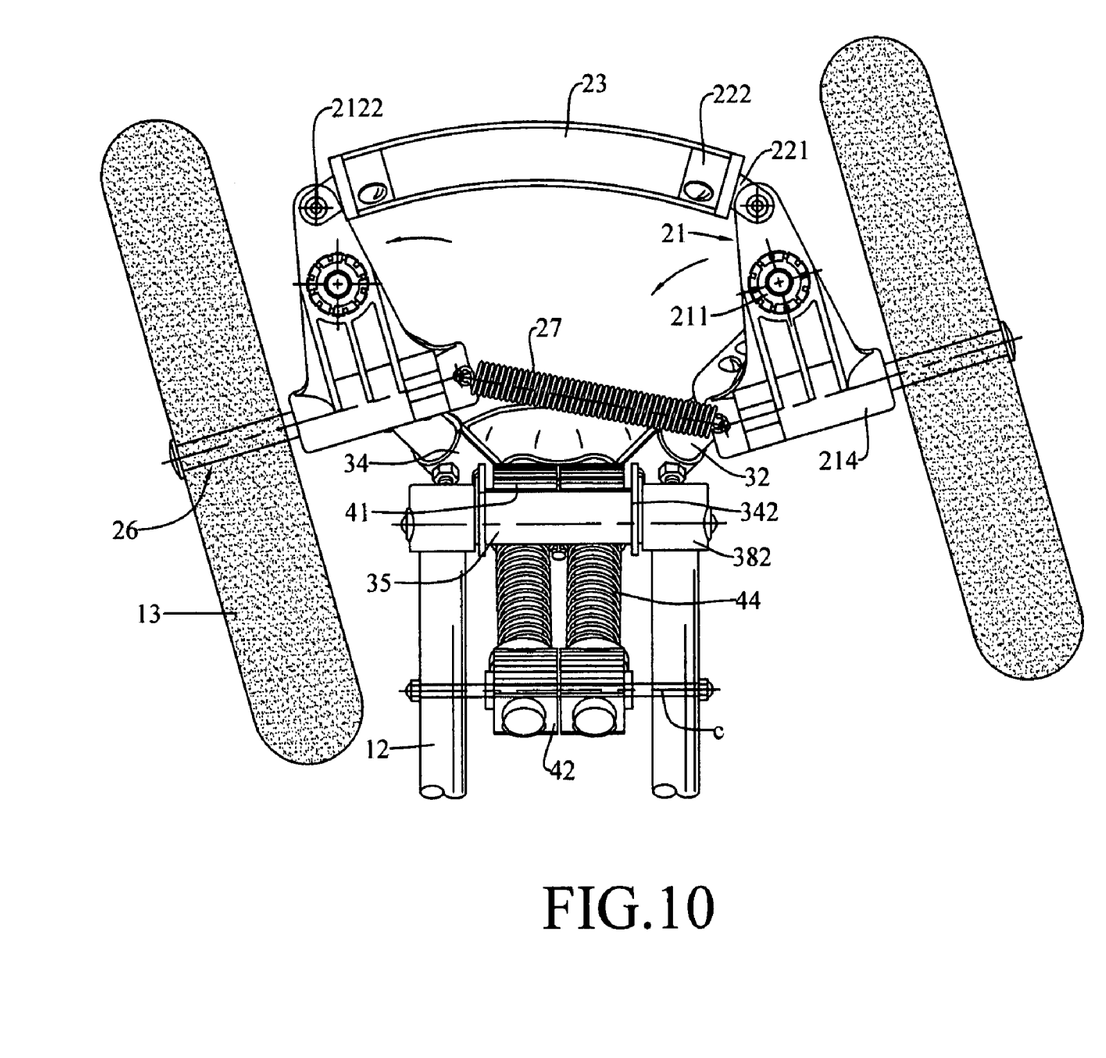
FIG. 10 is a schematic operational view of the stroller as shown in FIG. 5.

In operation, referring to FIGS. 9 and 10 with reference to FIGS. 1–8, the linkage 2 is disposed at a suspending state and is pivoted freely, so that the two front wheels 13 of the main frame 1 are turned freely. Thus, when the two front wheels 13 of the main frame 1 are turned leftward and rightward, the shaft seats 21, the elbow 23 and the elastic member 27 of the linkage 2 are turned leftward and rightward with the two front wheels 13. In addition, the front wheels 13 are returned to the original linear state by the restoring force of the elastic member 27 of the linkage 2, thereby facilitating the user operating the stroller.

Figure 11:
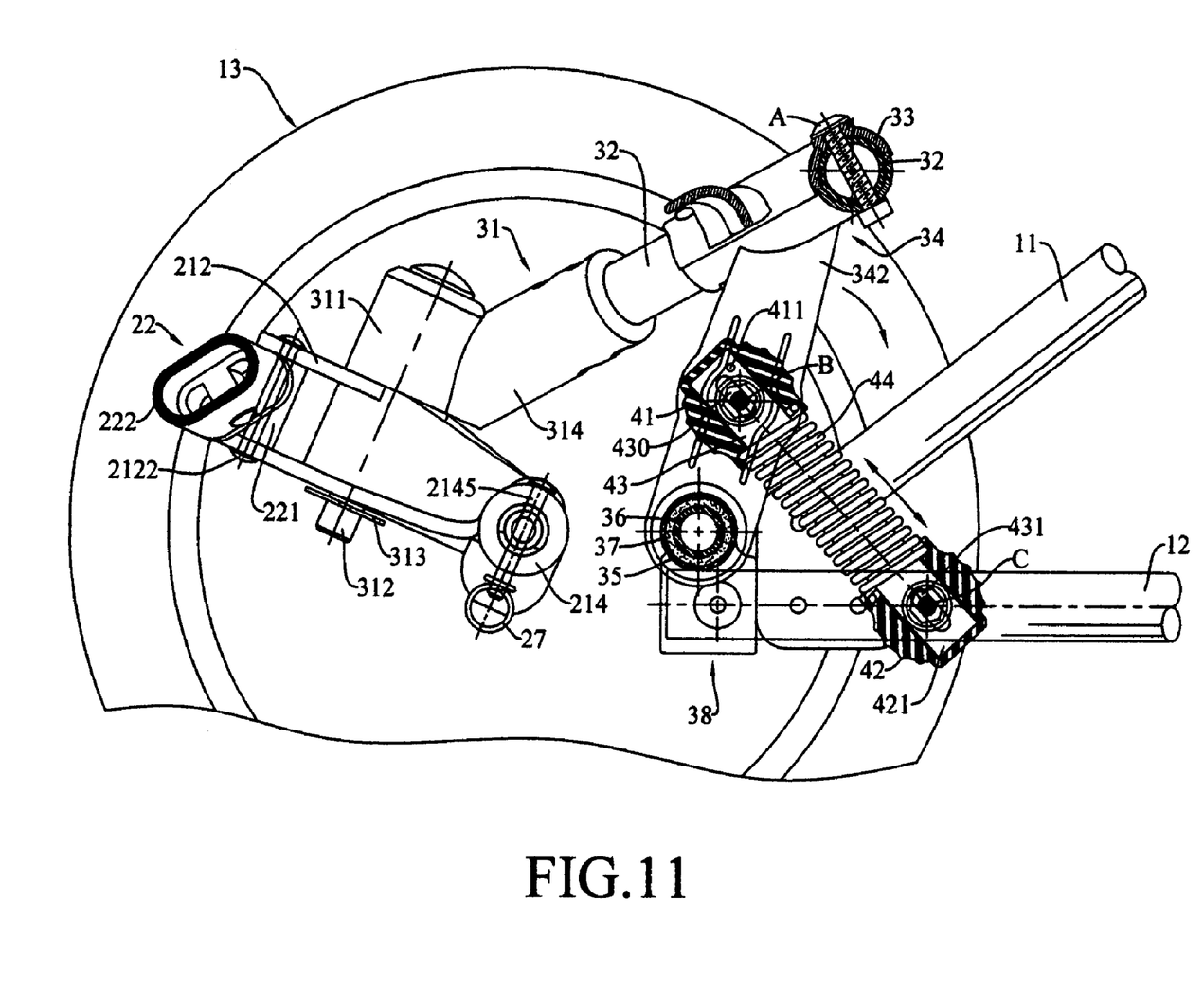
FIG. 11 is a schematic operational view of the stroller as shown in FIG. 4.

Referring to FIG. 11, the shock-absorbing device 4 provides a shock-absorbing effect.

Accordingly, the front wheels 13 are turned leftward and rightward in a parallel manner by connection of the shaft seats 21, the elbow 23 and the elastic member 27 of the linkage 2, so that the front wheels 13 can be turned rightward and leftward easily and conveniently, thereby facilitating the user operating the stroller. In addition, the linkage 2 provides a balance effect, so that the front wheels 13 can be turned stably and smoothly. Further, the stroller has a shock-absorbing effect by design of the shock-absorbing device 4.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A stroller, comprising a main frame, a linkage, and a support unit, wherein:
   the main frame has two bottom rails and two front wheels;
   the linkage includes two shaft seats, two mounting sleeves, an elbow, two mounting rings, two connecting tubes, two wheel shafts, and an elastic member;
   each of the shaft seats has a first end formed with two support plates and a receiving space located between the two support plates, and a second end formed with a barrel having an inside formed with a through hole, the barrel has a periphery formed with a recess communicating with the through hole;
   each of the mounting sleeves is pivotally mounted on a respective one of the shaft seats and has a first end formed with a pivot portion pivotally mounted in the receiving space between the support plates of the respective shaft seat and a second end formed with a mounting portion;
   the elbow is mounted between the mounting sleeves;
   each of the mounting rings is mounted in the recess of the barrel of a respective one of the two shaft seats and has an inner wall formed with a through bore aligning with the through hole of the barrel and a protruding locking block extended radially inward from the through bore;
   each of the connecting tubes is mounted in the through hole of the barrel of a respective one of the shaft seats and extended through the through bore of a respective one of the mounting rings;
   each of the wheel shafts is extended through a respective one of the front wheels and detachably locked in a respective one of the connecting tubes;
   the elastic member is urged between the shaft seats;
   the support unit is mounted on the linkage and includes two joints, a main bracket, a cover, a support bracket, a mounting tube, an inner tube, and two connecting seats;
   each of the joints has a first side formed with a base pivotally mounted on a respective one of the shaft seats and a second side formed with a socket;
   the main bracket is mounted between the joints;
   the cover is mounted on the main bracket;
   the support bracket is mounted on the main bracket and has a lower portion formed with two opposite support plates each formed with a first hole and a second hole;
   the mounting tube is mounted between the support plates of the support bracket and is aligned with the second hole of each of the support plates;
   the inner tube is mounted in the mounting tube and has two ends protruding from the support plates of the support bracket;
   each of the connecting seats is mounted between the support bracket and a respective one of the bottom rails of the main frame and includes a first sleeve mounted on a respective end of the inner tube and a second sleeve mounted on a front end of a respective one of the bottom rails.

2. The stroller in accordance with claim 1, wherein each of the support plates is formed with a pivot hole, the pivot portion of each of the mounting sleeves is formed with a pivot hole aligning with the pivot hole of each of the support plates, and the linkage further includes two pivot pins each extended through the pivot hole of each of the support plates of a respective one of the shaft seats and the pivot hole of the pivot portion of a respective one of the mounting sleeves, so that each of the mounting sleeves is pivotally mounted on a respective one of the shaft seats.

3. The stroller in accordance with claim 1, wherein the mounting portion of each of the mounting sleeves is formed with a fixing hole, the elbow has two ends each formed with a fixing hole, and the linkage further includes two fixing pins each extended through the respective fixing hole of the elbow and the fixing hole of the mounting portion of a respective one of the mounting sleeves, so that the elbow is mounted between the mounting sleeves.

4. The stroller in accordance with claim 1, wherein the periphery of the barrel has is formed with a chamber located opposite to the recess and communicating with the through hole, and each of the mounting rings has an outer wall formed with a mounting post for mounting an elastic member which is mounted in the chamber of the barrel and urged between each of the mounting rings and the respective barrel.

5. The stroller in accordance with claim 1, wherein each of the connecting tubes has a periphery formed with a passage for passage of the locking block of a respective one of the mounting rings.

6. The stroller in accordance with claim 1, wherein the barrel is formed with a fixing hole located beside the recess, each of the connecting tubes has an end formed with a fixing hole, and the linkage further includes two fixing shafts each extended through the fixing hole of the barrel of a respective one of the shaft seats and the fixing hole of a respective one of the connecting tubes, so that each of the connecting tubes is fixed on a respective one of the two shaft seats.

7. The stroller in accordance with claim 6, wherein each of the fixing shafts has a distal end protruding from the barrel of a respective one of the shaft seats, and the elastic member has two ends each mounted on the distal end of a respective one of the fixing shafts.

8. The stroller in accordance with claim 1, wherein each of the wheel shafts has a tapered distal end formed with a locking groove to detachably lock the locking block of a respective one of the mounting rings.

9. The stroller in accordance with claim 1, wherein each of the shaft seats is formed with an axial hole, the base of each of the joints is formed with an axial hole, and the support unit further includes two pivot pins each extended through the axial hole of the base of a respective one of the joints and the axial hole of a respective one of the shaft seats, and two C-shaped snaps each secured on a respective one of the pivot pins and each rested on a respective one of the shaft seats, so that each of the joints is pivotally mounted on a respective one of the shaft seats.

10. The stroller in accordance with claim 1, wherein the main bracket has two ends each fixed on the socket of a respective one of the joints by a plurality of fixing pins.

11. The stroller in accordance with claim 1, wherein the support bracket is combined with the cover, so that the main bracket is clamped between the cover and the support bracket.

12. The stroller in accordance with claim 1, wherein the second sleeve of each of the connecting seats is vertical to the first sleeve and formed with a fixing hole, and the support unit further includes two fixing pins each extended through the fixing hole of the second sleeve of a respective one of the connecting seats and fixed in a respective one of the bottom rails.

13. The stroller in accordance with claim 1, wherein the support unit further includes two rubber jackets each mounted on the inner tube.

14. The stroller in accordance with claim 13, wherein each of the rubber jackets has a stepped shape and has a first portion inserted into the mounting tube and a second portion inserted into the first sleeve of a respective one of the connecting seats.

15. The stroller in accordance with claim 1, further comprising a shock-absorbing device mounted between the main frame and the support unit and including two first knobs, two second knobs, two inner rods, and two elastic members, wherein:

each of the first knobs is pivotally mounted on a respective one of the support plates of the support bracket;

each of the second knobs is pivotally mounted on a respective one of the bottom rails;

each of the inner rods is mounted between a respective one of the first knobs and a respective one of the second knobs; and each of the elastic members is mounted on a respective one of the inner rods and urged between a respective one of the first knobs and a respective one of the second knobs.

16. The stroller in accordance with claim 15, wherein the shock-absorbing device further includes two first axles each extended through a respective one of the first knobs and the first hole of a respective one of the support plates of the support bracket.

17. The stroller in accordance with claim 16, wherein the shock-absorbing device further includes two second axles each extended through a respective one of the second knobs and a respective one of the bottom rails.

18. The stroller in accordance with claim 15, wherein each of the first knobs is formed with a mounting hole, each of the second knobs is formed with a mounting hole, each of the inner rods has a first end mounted in the mounting hole of a respective one of the first knobs and a second end mounted in the mounting hole of a respective one of the second knobs.

* * * * *